Figure 1:
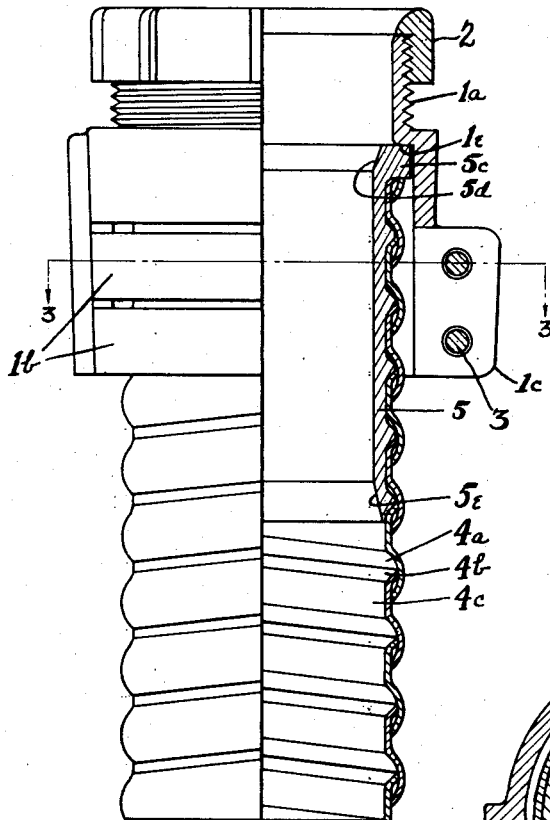

April 14, 1931.                  D. L. HUNTER                  1,800,348
                                CONDUIT SLEEVE
                              Filed March 19, 1928

INVENTOR.
Daniel L. Hunter.
BY  Vincent Martin
ATTORNEY.

Patented Apr. 14, 1931

1,800,348

UNITED STATES PATENT OFFICE

DANIEL L. HUNTER, OF HOUSTON, TEXAS, ASSIGNOR TO HUNTER-WALKER COMPANY, OF HOUSTON, TEXAS, A CORPORATION OF TEXAS

CONDUIT SLEEVE

Application filed March 19, 1928. Serial No. 262,700.

This invention relates to connectors adapted to connect flexible metallic conduits to outlet boxes and the like.

The general object of the invention is the provision of a new and improved connector embodying means to rigidly grip a conduit and to protect the electric wires extending through said conduit into the box or other element to which the connector is secured.

A more specific object of the invention is to provide a new and improved sleeve or bushing particularly adapted for use in the connector disclosed in the drawings.

Other objects will hereinafter appear.

Figure 2:
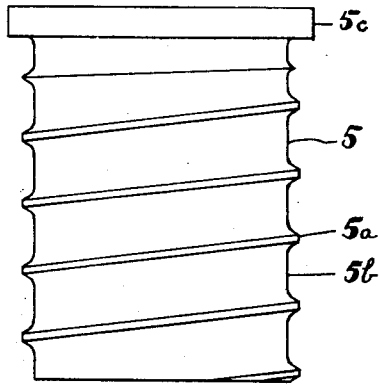
Figure 3:
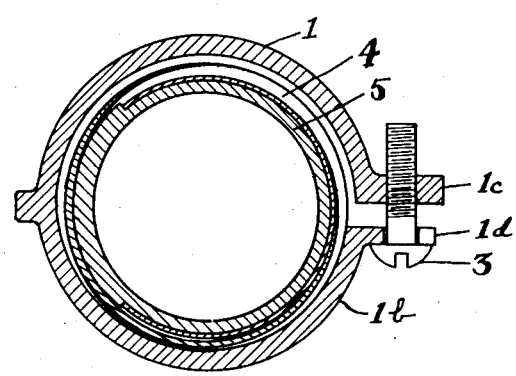

In the accompanying drawings, which are illustrative of the preferred embodiment of the invention, Fig. 1 is a partly sectional side elevation of the connector with a flexible metallic conduit secured therein; Fig. 2, a side elevation of the sleeve or bushing; and Fig. 3, a horizontal section on the line 3—3 of Fig. 1.

The box connector 1 has a reduced screw-threaded end 1a adapted to be passed through an opening in a box and secured therein by nut 2. The other end of the connector is semi-circumferentially split to provide the clamping sections 1b. Screws 3 passing through ears 1c and 1d serve to move said sections into gripping engagement with the conduit 4, comprising a spirally wound band.

The connector just described is now in common use and I do not claim it per se. It is well known to those skilled in the art that the end of the flexible conduit extending into this connector presents a sharp cutting edge; and as the connector cannot rigidly hold the conduit, the vibration of a motor, the weight of the conduit, and many other causes move the sharp edge referred to into contact with the wires, cutting the insulation thereof, and permitting leaks from the wires through the connector to the ground, and short circuiting of the wires. The connector also permits the separation of the normally interlocking adjacent portions of the spirally wound conduit and consequent exposure of the wires.

This invention eliminates all of the objections to the connector referred to in the immediately preceding paragraph, by the provision of the sleeve or bushing 5 having the threads 5a thereon shaped to engage the internal threads formed by the spirally wound band of the conduit 4. It will be observed that the outer edges of these threads are flat to engage the portions 4a of the band adjacent the edges 4b of the band; and that the flat intermediate portions 5b of the sleeve engage the flat portions 4c of the band. The sleeve may easily be screwed into the end of the conduit but cannot forcibly be screwed out of it, because of the relative movement of adjacent portions of the band.

The upper end of the sleeve has an annular flange 5c against which the upper end of the conduit abuts; and this flange engages the internal shoulder 1e of the connector formed by the reduction of the upper end thereof. The upper and lower ends of the bore of the sleeve are flared as indicated respectively at 5d and 5e. The wires are thus fully protected. And when the clamping sections 1b of the connector are moved inwardly by the screws, the conduit 4 is rigidly gripped between the sleeve 5 and the connector 1.

I claim:

1. The combination with a connector and a flexible metallic conduit, said connector having a reduced screw threaded end forming an internal annular shoulder, and having a clamping section, of a sleeve having a screw threaded body adapted to be screwed into said conduit and having an annular flange to cover the end of said conduit, said conduit with said sleeve therein being insertible in said connector so that said flange engages said shoulder and said body is adjacent said clamping section, whereby said conduit may be rigidly held by said clamping section and said body.

2. The combination with a connector having a reduced screw threaded end forming an internal annular shoulder, and having a semi-circumferentially split clamping section, and a flexible conduit, of a sleeve adapted to be screwed into said conduit and having an annular flange to cover the end thereof, said conduit with said sleeve therein being insertible in said connector so that said flange is disposed between said shoulder and said clamping section.

3. The combination with a connector and a flexible metallic conduit comprising a spirally wound band, said connector having a reduced screw-threaded end forming an internal annular shoulder, and having a radially adjustable clamping section, of a sleeve having a screw-threaded body adapted to be screwed into said conduit and having an annular flange to cover the end of said conduit, said flange being of an external diameter greater than the external diameter of said conduit, said conduit with said sleeve therein being insertible in said connector so that said flange engages said shoulder and said body is adjacent said clamping section, whereby said conduit may be rigidly held by said clamping section and said body.

4. The combination with a connector having a reduced screw-threaded end forming an internal annular shoulder, and having a semi-circumferentially split clamping section, and a flexible conduit, of a sleeve adapted to be screwed into said conduit and having an annular flange to cover the end thereof, said flange being of an external diameter greater than the external diameter of said conduit, said conduit with said sleeve therein being insertible in said connector so that said flange is disposed between said shoulder and said clamping section.

In testimony whereof, I hereunto affix my signature.

DANIEL L. HUNTER.